United States Patent Office 3,652,584
Patented Mar. 28, 1972

3,652,584
1,3-DI-ARYL-1,2-PYRAZOLINES AND THEIR
PREPARATION
Andre Henri Passedouet, Maisons-Lafitte, Michel G. Roussos, Lyon, and Jacqueline Pigeot and Nicole Paillole, Maisons-Lafitte, France, assignors to Societe Melle Bezons, Melle, France
No Drawing. Filed Feb. 16, 1968, Ser. No. 705,914
Claims priority, application France, Feb. 17, 1967, 95,347
Int. Cl. C07d 49/10
U.S. Cl. 260—310
10 Claims

ABSTRACT OF THE DISCLOSURE 1,3-di-aryl-1,2-pyrazolines having detectable affinity for different nervous tissues to provide sedative, anti-inflammatory and/or anti-pyretic properties. The compositions are of the formula

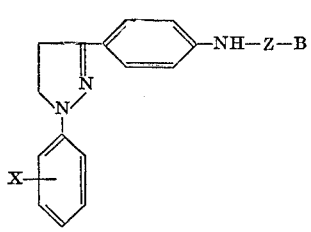

in which X is Cl or $CF_3$; Z is a keto-alkylene group having 2 to 4 carbon atoms; B is a basic radical of the formula $NR_1 R_2$, where $R_1$ is an alkyl group having 1 to 4 carbon atoms and $R_2$ is the same as $R_1$ or hydrogen, and the pharmaceutically acceptable acid addition salts thereof. The compounds are prepared by condensing a compound of the formula

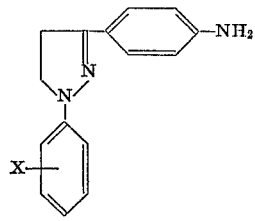

with a compound of the formula ClZB.

---

The present invention relates to novel 1,3-di-aryl-1,2-pyrazolines, their preparation and compositions containing them.

We have found that 1,3-di-aryl-1,2-pyrazolines of the formula:

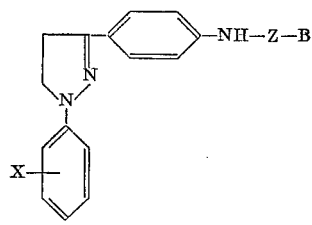

I in which X is Cl or a $CF_3$ group, Z is an alkylene or keto-alkylene group having 2 to 4 carbon atoms, B is a basic radical containing 1, 2 or 3 nitrogen atoms and of the Formula I —$NR_1R_2$ or II —NH—A—$NR_3R_4$, where A is an alkylene group having 2 to 4 carbon atoms and $R_1$, $R_2$, $R_3$ and $R_4$ is each hydrogen or an alkyl group having 1 to 4 carbon atoms or $R_1$ and $R_2$ or $R_3$ and $R_4$ form, together with the nitrogen atom to which they are attached, a 5- or 6-membered heterocyclic ring which may, if desired, contain an additional hetero atom, such as O, S or N, and which may, if desired, be substituted, for example, by a similar heterocyclic group, and the acid addition salts of these compounds, have valuable pharmacological properties. More particularly, these compounds have sedative, tranquilizing, relaxing, tension-relieving, anti-inflammatory and/or antipyretic properties.

The compounds of Formula I and their acid addition salts are novel compounds and constitute one aspect of the present invention.

The present invention is also directed to pharmaceutical compositions comprising a compound of Formula I or a physiologically acceptable acid addition salt thereof and an inert, physiologically acceptable, carrier.

The compounds according to the invention have a detectable affinity for different nervous tissues, i.e. the central nervous system or other tissues up to and including the nerve-ends.The compounds have a blue or greenish fluorescence and this enables their resorption, tropism and elimination to be studied in animals. The use of fluorescence phenomena in anatomy, physiology and experimental pathology is a recent technique, but one well known to specialists.

Biological investigations into the compounds according to the invention have been made by pharmacological tests and by measuring the selective affinity of the substances for particular tissues and organs.

The compounds of Formula I can be prepared by condensing a compound of the formula

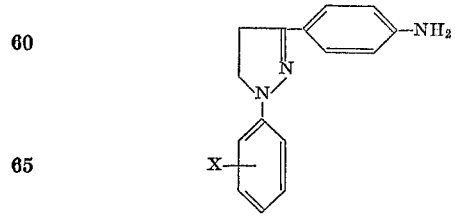

II with a compound of the formula ClZB. Where Z is a ketoalkylene group, the compounds of Formula I can also be prepared by condensing a starting material of Formula II with a chloracyl chloride of the formula ClCOZ'Cl, where Z' is an alkylene group and then condensing the product obtained with a base HB.

The starting materials of Formula II can be obtained by known methods, for example by condensing an X-substituted phenyl-hydrazine with 4-acetamido-β-chloropropiophenone, and hydrolyzing the 1,3-di-aryl-1,2-pyrazoline acetamide obtained to give the amine starting material of Formula II.

In order that the invention may be more fully understood, the following examples are given by way of illustration only:

EXAMPLE 1

Preparation of 1-(m-chlorophenyl)-3-(p-diethylaminoethylanilino)-1,2-pyrazoline (a) The following substances were successively introduced into a 2 litre flask:

96 g. m-chlorophenyl hydrazine sulphate,
113 g. 4-acetamido-β-chloropropiophenone,
82 g. anhydrous sodium acetate, and
1000 ml. methanol.

The mixture was allowed to react, with stirring, for 16 hours at room temperature and was then heated for 1 hour at reflux temperature and then cooled to 5° C. The reaction product crystallized, separated from the reaction mixture, washed in cold methanol and water, and dried at 50° C. in vacuo.

A 90% yield of 1-(m-chlorophenyl)-3-(p-acetamidophenyl)-1,2-pyrazoline was obtained, M.P. 223° C.; Cl, 11.1% (theoretical 11.3%).

(b) The acetylated product of step (a) was de-acetylated by heating for 3 hours at reflux temperature in 6 parts by weight of a mixture of:

acetic acid: 470 parts by weight
sulphuric acid: 160 parts by weight
water: 310 parts by weight.

The resulting solution was cooled and poured into a large volume of water, giving a precipitate which is separated and then suspended in 1000 parts of 5% aqueous caustic soda. After stirring for an hour, the aqueous solution was tested to ensure that its pH is above 9, after which the aminopyrazoline was separated, washed in water and dried in vacuo at 50° C. The yield was 94%; M.P. 132° C.; Cl, 13.15% (theoretical: 13.07%).

(c) The following substances were introduced into a 500 ml. flask:

27.1 g. of the amino intermediate obtained in step (b), 270 ml. n-butanol
18.3 g. 2-diethylamino-1-chloroethane The mixture was heated to 100° C. for 3 hours, cooled to 0° C. and the crystallized product was separated. The crude product was extracted with 200 ml. benzene in the presence of dilute aqueous caustic soda. The organic phase was washed with water, reduced in volume, added to acetone and gaseous hydrochloric acid was passed through the mixture to precipitate the product. 1-(m-chlorophenyl)-3-(p-diethylaminoethylanilino)-1,2-pyrazoline hydrochloride was obtained, M.P. 207° C.; Cl, 17.7% (theoretical: 17.45%).

EXAMPLE 2

Preparation of 1-(m-chlorophenyl)-3-(p-diethylaminoacetamidophenyl)-1,2-pyrazoline hydrochloride 17 g. monochloroacetyl chloride and 5 ml. benzene were introduced into a 500 ml. flask, followed by a mixture of 27.1 g. 1-(m-chlorophenyl)-3-(p-aminophenyl)-1,2-pyrazoline (prepared as in Example 1), 12 g. pyridine and 100 ml. benzene. The temperature was maintained at between 30 and 50° C. and the mixture was left overnight, after which the chloroacetylated derivative crystallized. The yield was 31 g.

The 31 g. of dry intermediate were dispersed in 100 ml. ethanol and 20 ml. diethylamine were added. The mixture was gently heated to 65–70° C. under reflux and kept at this temperature for 3 hours. The excess diethylamine and alcohol were driven off and the crude hydrochloride was decomposed by stirring it with an excess of 5% NaOH, after which the liberated base was extracted with benzene. The pure hydrochloride was obtained in crystalline form by passing a stream of dry HCl through the benzene extract. 19 g. of the product were obtained by filtration and drying. The yield was 45%; M.P. 215° C, Cl, 16.7% (theoretical: 16.88%).

EXAMPLE 3

1 - (m - trifluoromethyl) - 3-(p-diethylaminoethylanilino)-1,2-pyrazoline hydrochloride was prepared under the same process conditions as in Example 1; M.P. 213° C.; Cl, 8.4% (theoretical: 8.29%).

EXAMPLE 4

Under the same conditions as in Examples 1 and 2, 1,3-diaryl-1,2-pyrazolines were prepared in which the aryl group in the 3-position was m-diethylaminoacetamidophenyl and with two different aryl groups in the 1-position.

1-Aryl group p-chlorophenyl (HCl): M.P. 224° C.; Cl, 16.5% (theoretical, 16.88%);
m-trifluoromethylphenyl (base): M.P. 155° C.; basicity: 133 (theoretical: 134) basicity determined with HClO₄ in acetic acid.

EXAMPLE 5

Under the same conditions as in Examples 1 and 2, 1,3-di-aryl-1,2-pyrazolines were prepared in which the 1-aryl group is my-chlorophenyl and the 3-aryl group has the form

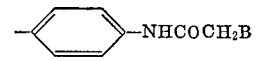—NHCOCH₂B with different basic radicals B. The compound in which B=N(C₂H₅)₂ has been described in detail in Example 2.

| B | |
|---|---|
| —NHCH₃(HCl) | M.P. 242° C. (decomp.); Cl, 18.3% (theoretical 18.7%). |
| —N(CH₃)₂ (base) | M.P. 149° C.; Cl, 9.75% (theoretical 9.96%). |
| —NHC₂H₅(HCl) | M.P. 240° C. (decomp.); Cl, 17.8% (theoretical 18.08%). |
| —NHiC₃H₇ (base) | M.P. 145° C.; Cl, 9.6% (theoretical 9.58%). |
| —N(iC₃H₇)₂ (base) | M.P. 122° C.; Cl, 8.4% (theoretical 8.6%). |
| —N͡O (base) | M.P. 170° C.; Cl, 8.8% (theoretical 8.9%). |
| —N͡NCH₂CH₂OH (base) | M.P. 167° C.; Cl, 8.1% (theoretical 8.04%). |

The compounds according to the invention have valuable pharmacological properties. These properties have been evaluated in the following manner:

I—Anti-inflammation test (oedema caused by kaolin)

The tests were made on groups of 10 mice. 0.1 ml. of a 10% suspension of kaolin was injected into one back paw, leaving the other paw as a control.

One group of mice received no treatment after the injection of kaolin. Another group was given a peritoneal dose of 0.050 g./kg. delta-hydrocortisone 2 hours after the injection of kaolin. The other groups were given a peritoneal dose of the compound under test 2 hours after the kaolin injection. The dose used was 0.100 g./kg. for compounds with an $LD_{50}$ above 2.5 g./kg. and a dose of one-tenth of the $LD_{50}$ for those with an $LD_{50}$ below 2.5 g./kg.

After 24 hours, the animals were killed and the paws were weighed so as to calculate the percentage inflammation. The following measurements were made:

(1) The percentage inflammation of the untreated group, by comparing the weight of paws with and without kaolin. (Symbol: P1).

(2) The percentage inflammation of the group treated with delta-hydrocortisone. (Symbol: P2).

(3) The percentage inflammation of the group treated with a compound according to the invention. (Symbol: P3).

The anti-inflammatory action of delta-hydrocortisone in doses of 0.050 g./kg. is given by the formula $(P1/P2-1) \times 100$. The formula is expressed as a percentage.

Similarly, the anti-inflammatory action of the compound under test is defined by the expression $(P1/P3-1) \times 100$.

Finally, the anti-inflammatory action of the compound is compared with that of delta-hydrocortisone as determined at identical times and with identical operating conditions. This is because the anti-inflammatory action varies according to the susceptibility of the animals and some seasonal factors.

A.C. (comparative activity) denotes the ratio of the anti-inflammatory action of the product to the action of delta-hydrocortisone.

II—Antipyretic test

Mice were given a high body temperature of central origin by an intraperitoneal injection of anti-gonococcal vaccine, the dose corresponding to 200 million organisms per kg. of mouse. The rectal temperature was noted every 30 minutes.

The anti-gonococcal vaccine raised the temperature by a maximum of the order of 2.0° C., generally occurring after 2½ hours.

The required dose of the compound under test was injected 1 hour 30 min. after the anti-gonococcal vaccine had been administered.

The antipyretic substances caused a rapid drop in temperature.

One hour after the compound under test had been administered, the difference between the temperature of the control mice and that of the treated mice was measured. This difference, $\Delta t$, expresses the antipyretic activity.

The compounds according to the invention have been studied in doses of $1/10$ of the $LD_{50}$.

Results of tests with some compounds according to the invention are shown in the following table:

| Compound No. | X | ZB | Dose, g./kg. | $\Delta t$, °C. | Comparative anti-inflammatory activity |
|---|---|---|---|---|---|
| 1 | p-Cl | $COCH_2N(C_2H_5)_2$ | 0.100 | | 1.6 |
| 2 | m-CF$_3$ | $COCH_2N(C_2H_5)_2$ | 0.085 | | 1.25 |
| 3 | m-Cl | $COCH_2N(C_2H_5)_2$ | 0.100 | | 2.1 |
| 4 | m-CF$_3$ | $CH_2CH_2N(C_2H_5)_2$ | 0.100 | | 1.4 |
| 5 | m-Cl | $CH_2CH_2N(C_2H_5)_2$ | 0.100 | | 1.1 |
| 6 | m-Cl | $COCH_2N(CH_3)_2$ | 0.185 | 1.0 | 0.98 |
| 7 | m-Cl | $COCH_2NH(C_2H_5)$ | 0.125 | | 2.1 |
| 8 | m-Cl | $COCH_2N(iC_3H_7)_2$ | 0.225 | 0.7 | 1.7 |
| 9 | m-Cl | $COCH_2N\langle\phantom{x}\rangle O$ (morpholino) | 0.043 | | 1.3 |
| 10 | m-Cl | $COCH_2N\langle\phantom{x}\rangle NCH_2CH_2OH$ | 0.028 | | 1.4 |
| Controls | | | | | Average 1.8 |

The compounds according to the invention have also been tested for their action on the central nervous system. Mice were treated with compound No. 5 (see table) and their behavior was studied, the method being as follows:

A group of 10 mice were given a peritoneal injection of 0.100 g./kg. of the compound; the $LD_{50}$ of this compound, when administered orally, is more than 2 g./kg.

A decrease was observed in spontaneous activity, exploration reactions, and muscular strength. The animals became unable to stand on a metal rod (tranquillization test).

Another group of 10 mice were given 0.150 g./kg. of phenobarbitone. Five of these mice were also given 0.100 g./kg. of the compound under test. The average length of sleep was noted for mice which had received phenobarbitone alone and mice which had been given phenobarbitone and the compound under test.

Average length of sleep:
Phenobarbitone alone: 6 h. 56 min.
Phenobarbitone+compound: 4 min.

The same experiment was carried out on another group of 10 mice, which were injected with 0.060 g./kg. of thiopentone. Half the group were given 0.100 g./kg. of the compound tested.

Average length of sleep:
Thiopentone alone: 4 min. 33 sec.
Thiopentone+compound tested: 21 min. 18 sec.

A decrease was also observed in the effects (squeaks, excitement, bristling hair, sialorrhoea) of 0.030 g./kg. amphetamine.

There was also a marked diminution in the effects (watering eyes, sialorrhoea, sweating, diuresis, tremors, diarrhoea) of 0.030 g./kg. tremorine and 0.175 g./kg. emetine.

These results indicate a sedative, anti-depressant and tranquillizing action.

The main pharmacological effects of the specific compounds mentioned above, in doses of $1/10$ of the $LD_{50}$ or 0.100 g./kg. for compounds not toxic at 2 g./kg., will now be given in greater detail:

COMPOUNDS OF EXAMPLES 2 AND 4
[3-aryl-p-diethylaminoacetamidophenyl]

| 1-aryl | Main pharmacological effects |
|---|---|
| m-Chlorophenyl | Nerve and muscular depressant; anti-inflammatory action comparable with Δ-hydrocortisone. |
| p-Chlorophenyl | Bulbar excitant: anti-inflammatory action comparable with Δ-hydrocortisone. |
| m-Trifluoromethyl-phenyl | Sedative, potentiates barbiturates; anti-inflammatory action comparable with Δ-hydrocortisone. |

COMPOUNDS OF EXAMPLE 5

| Radical B | Main pharmacological effects |
|---|---|
| $N(CH_3)_2$ | Sedative; antipyretic; slightly anti-inflammatory. |
| $NHC_2H_5$ | Sedative, potentiates barbiturates. |
| $N(iC_3H_7)_2$ | Sedative; antipyretic; anti-inflammatory. |
| morpholino (N⌬O) | Synergistic with barbiturates; anti-inflammatory, more active than Δ-hydrocortisone. |
| piperazinyl-$NCH_2CH_2OH$ | Synergistic with barbiturates; anti-inflammatory, more active than Δ-hydrocortisone. |

COMPOUNDS OF EXAMPLE 3
[3-aryl-p-diethylaminoethylanilino]

| 1-aryl | Main pharmacological effects |
|---|---|
| m-Trifluoromethyl phenyl | Sensitive for bulbar centres; intensifies reflex action. |
| m-Chlorophenyl | Sedative; anti-depressant. |

The 1,3-di-aryl-1,2-pyrazolines according to the invention have relatively marked pharmacological effects depending on their relative affinity for the central nervous system or the peripheral nervous system. Measurements of acute toxicity show similar variations, depending on the structure of the substituents on the aryl groups. The acute toxicity of certain compounds according to the invention is set out in the following table.

| Nature of X | Nature of Z.B. | Method of administration | $LD_{50}$ (g./kg.) |
|---|---|---|---|
| p-Cl | $COCH_2N(C_2H_5)_2$ | Oral | 2 |
| m-$CF_3$ | $COCH_2N(C_2H_5)_2$ | Peritoneal | 0.850 |
| m-Cl | $COCH_2N(CH_3)_2$ | do | 1.850 |
| m-Cl | $COCH_2N(C_2H_5)_2$ | Oral | 2 |
| m-Cl | $COCH_2N$(morpholino) | Peritoneal | 0.430 |
| m-Cl | $COCH_2N$(piperazinyl)$NCH_2CH_2OH$ | do | 0.275 |
| m-Cl | $COCH_2NHC_2H_5$ | do | 1.250 |
| m-Cl | $COCH_2N(iC_3H_7)_2$ | do | 2.25 |

The compounds according to the invention all have limited toxicity and can therefore be adaptable for medical usage.

The sub-chronic oral administration of the compounds in daily doses of ½₀ of the $LD_{50}$ for 100 days does not lead to any cumulative toxic effects.

The compounds according to the invention can be formulated in a variety of pharmaceutical compositions; since they are preferably administered orally, compositions suitable for oral administration, such as capsules, cachets, compressed tablets and granulated powders, are preferred. Any of the conventional pharmaceutical carriers can be used. The compounds according to the invention can be used in conjunction with other drugs since they have excellent stability and do not react with other active substances.

The compounds are slightly basic when they contain 1 nitrogen atom and are more strongly basic when they contain 2 or 3 nitrogen atoms. They can be administered in the manner described above in the form of their salts with physiologically acceptable mineral or organic acids. Some salts of these basic compounds, for example, the gluconates, citrates, glutamates and hydrochlorides, are extremely soluble in water and suitable for preparing drinkable liquid medicines.

Pharmaceutical compositions containing compounds according to the invention and in dosage unit form preferably contain from 0.005 to 0.500 g. of active substance. Suitably daily doses are from 0.01 to 5 g. of active substance.

What we claim is:

1. A 1,3-di-aryl-1,2-pyrazoline of the formula:

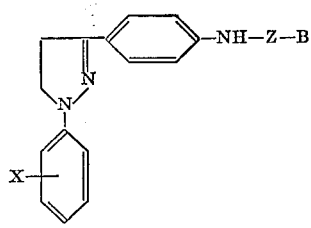

in which X is Cl or $CF_3$; Z is a keto-alkylene group having 2 to 4 carbon atoms; B is a basic radical of the formula $NR_1R_2$, where $R_1$ is an alkyl group having 1 to 4 carbon atoms and $R_2$ is the same as $R_1$ or hydrogen, and the pharmaceutically acceptable acid addition salts thereof.

2. The compound of claim 1 in which X is m-Cl and —Z—B is —$COCH_2N(C_2H_5)_2$ and its pharmaceutically acceptable acid addition salts.

3. The compound of claim 1 in which X is p-Cl and —Z—B is —$COCH_2N(C_2H_5)_2$ and its pharmaceutically acceptable acid addition salts.

4. The compound of claim 1 in which X is m-$CF_3$ and —Z—B is —$COCH_2N(C_2H_5)_2$ and its pharmaceutically acceptable acid addition salts.

5. The compound of claim 1 in which X is m-Cl and —Z—B is —$COCH_2NHCH_3$ and its pharmaceutically acceptable acid addition salts.

6. The compound of claim 1 in which X is m-Cl and —Z—B is —$COCH_2N(CH_3)_2$ and its pharmaceutically acceptable acid addition salts.

7. The compound of claim 1 in which X is m-Cl and —Z—B is —$COCH_2NHC_2H_5$ and its pharmaceutically acceptable acid addition salts.

8. The compound of claim 1 in which X is m-Cl and —Z—B is —$COCH_2NHiC_3H_7$ and its pharmaceutically acceptable acid addition salts.

9. The compound of claim 1 in which X is m-Cl and —Z—B is —COCH$_2$N(iC$_3$H$_7$)$_2$ and its pharmaceutically acceptable acid addition salts.

10. A process for the preparation of 1,3-di-aryl-1,2-pyrazolines of claim 1, which comprises condensing a compound of the formula

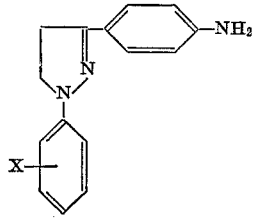

in which X has the meaning specified in claim 1, with a compound of the formula ClZB, in which Z and B have the meanings specified in claim 9.

References Cited
UNITED STATES PATENTS

| | | | |
|---|---|---|---|
| 3,398,158 | 8/1968 | Fusco et al. | 260—310 |
| 3,356,673 | 12/1967 | Favre et al. | 260—310 |

ALEX MAZEL, Primary Examiner

B. DENTZ, Assistant Examiner

U.S. Cl. X.R.

260—247.2, 247.5, 294; 424—248, 273, 267